(12) United States Patent
Sato (10) Patent No.: US 9,091,593 B2
(45) Date of Patent: Jul. 28, 2015

(54) OPTICAL INTENSITY DETERMINATION UNIT, METHOD OF FORMING THE SAME, AND OPTICAL A/D CONVERTER

(75) Inventor: Kenji Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

(21) Appl. No.: 13/816,160

(22) PCT Filed: Apr. 19, 2011

(86) PCT No.: PCT/JP2011/002285
§ 371 (c)(1),
(2), (4) Date: Feb. 8, 2013

(87) PCT Pub. No.: WO2012/020524
PCT Pub. Date: Feb. 16, 2012

(65) Prior Publication Data
US 2013/0134302 A1    May 30, 2013

(30) Foreign Application Priority Data

Aug. 9, 2010    (JP) .................................. 2010-178465

(51) Int. Cl.
G02F 1/035    (2006.01)
G01J 1/04     (2006.01)
H04B 10/079   (2013.01)
G02F 7/00     (2006.01)

(52) U.S. Cl.
CPC ......... *G01J 1/0459* (2013.01); *H04B 10/07955* (2013.01); *G02F 7/00* (2013.01)

(58) Field of Classification Search
CPC ..................................................... G02F 7/00
See application file for complete search history.

(56) References Cited

U.S. PATENT DOCUMENTS 4,775,214 A * 10/1988 Johnson ........................ 385/12
2008/0129564 A1    6/2008 Kitayama et al.

FOREIGN PATENT DOCUMENTS

| JP | 61-203566 U | 12/1986 |
| JP | 64-056426 A | 3/1989 |
| JP | 2003-241242 A | 8/2003 |
| JP | 2005-173530 A | 6/2005 |
| JP | 2006-276095 A | 10/2006 |
| JP | 2007-024924 A | 2/2007 |
| JP | 2008-052066 A | 3/2008 |
| WO | 2005/047970 A1 | 5/2005 |

* cited by examiner

*Primary Examiner* — Tina Wong
*Assistant Examiner* — Chad Smith
(74) *Attorney, Agent, or Firm* — Sughrue Mion, PLLC (57) ABSTRACT

An optical intensity determination unit includes: an optical input port; an optical output port; an optical resonator provided between the optical input port and the optical output port; a first light receiving element for converting at least a part of an optical signal output from a first output port of the optical resonator into an electric signal; a second light receiving element for converting at least a part of an optical signal output from a second output port of the optical resonator into an electric signal; a comparing circuit for determining magnitudes of the electric signals output from the first light receiving element and the second light receiving element to output a digital signal; and an optical branching circuit for branching light output from the second output port of the optical resonator into the optical output port and the second light receiving element. An optical intensity phase conversion unit for modulating an optical phase according to intensity of input light is provided in a part of a waveguide in the optical resonator.

8 Claims, 9 Drawing Sheets

OPTICAL INTENSITY DETERMINATION UNIT, METHOD OF FORMING THE SAME, AND OPTICAL A/D CONVERTER

CROSS REFERENCE TO RELATED APPLICATIONS

This application is a National Stage of International Application No. PCT/JP2011/002285, filed on Apr. 19, 2011, which claims priority from Japanese Patent Application No. 2010-178465, filed Aug. 9, 2010, the contents of all of which are incorporated herein by reference in their entirety.

TECHNICAL FIELD

The present invention relates to an optical intensity determination unit for converting intensity of input light into phase information to determine input light intensity, and an optical A/D converter using the optical intensity determination unit.

BACKGROUND ART

In medium-long distance optical communication systems, the speed has been increasing and the capacity has been larger owing to wavelength multiplexing. In current trunk-line optical communication systems, wavelength multiplexing communication is used and a wavelength channel spacing is determined. Accordingly, with 50 GHz spacing in the bandwidth of an optical fiber amplifier, about 100 channels can be used.

When the channel spacing is denoted by $\Delta f$[Hz] and the transmission rate is denoted by B[bit/s], B/$\Delta f$[bit/s/Hz] denotes spectral efficiency. Assume that $\Delta f$=50 GHz. In this case, with the transmission rate of 100 Gbit/s for each channel, the spectral efficiency is 2 bit/s/Hz.

Since the bandwidth of the optical fiber amplifier is limited, it is required to improve the spectral efficiency. However, a simple increase in the bit-rate of signals in order to increase the spectral efficiency causes a problem of crosstalk between channels. To address with this problem, optical multilevel modulation and optical orthogonal frequency-division multiplexing (OFDM) have been studied as next-generation optical communication systems. The optical multilevel modulation is different from the conventional optical intensity modulation that uses two values of 0 and 1, and is a method of increasing an amount of information without increasing the frequency usage bandwidth by performing multi-valuing using the amplitude and the phase of light. Meanwhile, in the optical OFDM, an OFDM signal is generated by an electric signal and the OFDM signal is optically modulated, and optical sub-carriers are multiplexed in a state in which the optical sub-carriers are orthogonally arranged. Accordingly, it is possible to solve the problem of crosstalk and to improve the spectral efficiency.

The transmitted optical signal after being subjected to multi-valuing or multiplexing mainly by electric signal processing as described above is demodulated into an electric signal on a receiving side. An analog/digital (A/D) converter needs to be provided at a subsequent stage of a PD (photodetector for light receiver) of an optical demodulator circuit. Recently, an A/D converter using an electric circuit has typically been used.

Meanwhile, many proposals have been made for an optical A/D converter that directly derives an analog amount of an optical signal as a digital value since it can be operated at high speed. For example, in PTL 1, a light signal is divided by predetermined division ratios different from one another to indicate the light amount by a predetermined ratio, thereby detecting an optical analog amount of an optical signal that is input depending on whether each of the divided optical signals reaches a threshold.

Further, in PTL 2, in optical A/D conversion means, a feedback system is formed through a non-linear optical element for an input light signal which is an analog signal, thereby sequentially obtaining first output light which is a digital signal from the optical A/D conversion means.

In PTL 3, an optical encoding circuit optically encodes a pulse train of signal light having a first wavelength according to control light which has a neighboring second wavelength different from the first wavelength and has a pulse train of an optically sampled optical analog signal, by using a plurality of optical encoders each including optical nonlinear devices having input-to-output characteristic with different periodicities with respect to the light intensity, and outputs a plurality of pulse trains of optically-encoded signal light from the respective optical encoders. Next, an optical quantization circuit performs optical threshold processing on each of the pulse trains of carrier wave light having a neighboring third wavelength different from the first wavelength according to the plurality of pulse trains of optically-encoded signal light to optically quantize the pulse trains of carrier wave light, by using a plurality of optical threshold processors each of which is connected to each of the optical encoders and includes a nonlinear optical device having a periodic input-to-output characteristic with respect to light intensity, and outputs optically quantized pulse trains as optical digital signals.

PTL 4 has characteristics in that a plurality of interferomatic optical modulators are provided, a photodetector device is formed on the same substrate, and an output voltage of the photodetector device is applied to the interferomatic optical modulators. Accordingly, in this example, since intensity signal light is converted into a voltage signal after being received by a PD once, the rate of the electric signal determines the rate of the whole circuit.

A phase difference can be used as a signal in addition to an intensity signal for light, and some PTLs include an apparatus using a phase difference as a signal. There are further examples that use this method to generate a phase difference for use from intensity without changing light into an electric modulation signal.

PTL 5 discloses a logical hold/logical inversion signal light generator 116 for converting an optical signal that is ON or OFF into a signal of phase difference using the optical signal.

PTL 6 discloses an apparatus that removes control light by a filter and uses a modulation signal of phase difference of light.

CITATION LIST

Patent Literature

PTL 1: Japanese Unexamined Patent Application Publication No. 2007-24924

PTL 2: Japanese Unexamined Patent Application Publication No. 1-56426

PTL 3: Japanese Unexamined Patent Application Publication No. 2005-173530

PTL 4: Japanese Unexamined Utility Model Application Publication No. 61-203566

PTL 5: Japanese Unexamined Patent Application Publication No. 2006-276095

PTL 6: Japanese Unexamined Patent Application Publication No. 2008-052066

SUMMARY OF INVENTION

Technical Problem

Since it is impossible to execute subtraction of power (amplitude) from light, it is required to take any measure to simply form the optical A/D converter. As disclosed in PTL 4, one possible method to simply form the optical A/D converter is to use a Mach-Zehnder (MZ) interferometer which uses phase information of light. This requires an apparatus to efficiently convert optical intensity signals into phase difference signals. In this specification, this whole apparatus is referred to as an optical intensity phase converter.

It is required in an optical intensity phase converter used for an optical A/D converter that uses an MZ interferometer to achieve different amounts of phase rotation for the same optical intensity. Specifically, when MZ interferometers whose number corresponds to the bit number are prepared, each MZ interferometer needs to include an apparatus for outputting different amounts of phase rotation for the same optical intensity. Further, it is preferable to have such a structure that makes it possible to connect an apparatus for performing a predetermined unitary phase rotation. However, it is difficult to simply achieve such a structure. In PTL 4, different amounts of phase rotation are added after converting light into electricity once, which complicates the configuration.

Further, in order to convert optical intensity into a phase, effects such as known self phase modulation (SPM) and cross phase modulation (XPM) that are characteristics of SOA devices are used. Such an optical intensity phase converter is arranged in the MZ interferometer to achieve determination of the optical intensity. However, in order to achieve an output of n bits, n pieces of waveguides having different amounts of phase rotation are required in the optical intensity phase converter. N pieces of phase conversion units each having the length of n-th power of 2 are arranged in parallel, which poses a problem that the size of the device increases when the bit number n becomes larger.

The present invention has been made based on the aforementioned circumstances, and aims to simply form an optical A/D converter without increasing the size of a device.

Solution to Problem

An optical intensity determination unit according to the present invention includes: an optical input port; an optical output port; an optical resonator provided between the optical input port and the optical output port; a first light receiving element for converting at least a part of an optical signal output from a first output port of the optical resonator into an electric signal; a second light receiving element for converting at least a part of an optical signal output from a second output port of the optical resonator into an electric signal; a comparing circuit for determining magnitudes of the electric signals output from the first light receiving element and the second light receiving element to output a digital signal; and an optical branching circuit for branching light output from the second output port of the optical resonator into the optical output port and the second light receiving element, in which an optical intensity phase conversion unit for modulating an optical phase according to intensity of input light is provided in a part of a waveguide in the optical resonator.

A method of forming an optical intensity determination unit according to the present invention includes: providing an optical resonator between an optical input port and an optical output port; providing a first light receiving element for converting at least a part of an optical signal output from a first output port of the optical resonator into an electric signal; providing a second light receiving element for converting at least a part of an optical signal output from a second output port of the optical resonator into an electric signal; providing a comparing circuit for determining magnitudes of the electric signals output from the first light receiving element and the second light receiving element to output a digital signal; and providing an optical branching circuit for branching light output from the second output port of the optical resonator into the optical output port and the second light receiving element, in which an optical intensity phase conversion unit for modulating an optical phase according to intensity of input light is provided in a part of a waveguide in the optical resonator.

Advantageous Effects of Invention

According to the present invention, it is possible to simply form an optical A/D converter without increasing the size of a device.

DESCRIPTION OF EMBODIMENTS

Hereinafter, specific exemplary embodiments to which the present invention is applied will be described in detail with reference to the drawings. However, the present invention is not limited to the exemplary embodiments stated below. Further, the following description and the drawings are simplified as appropriate for the sake of clarification of explanation.

(First Exemplary Embodiment)

Figure 1:
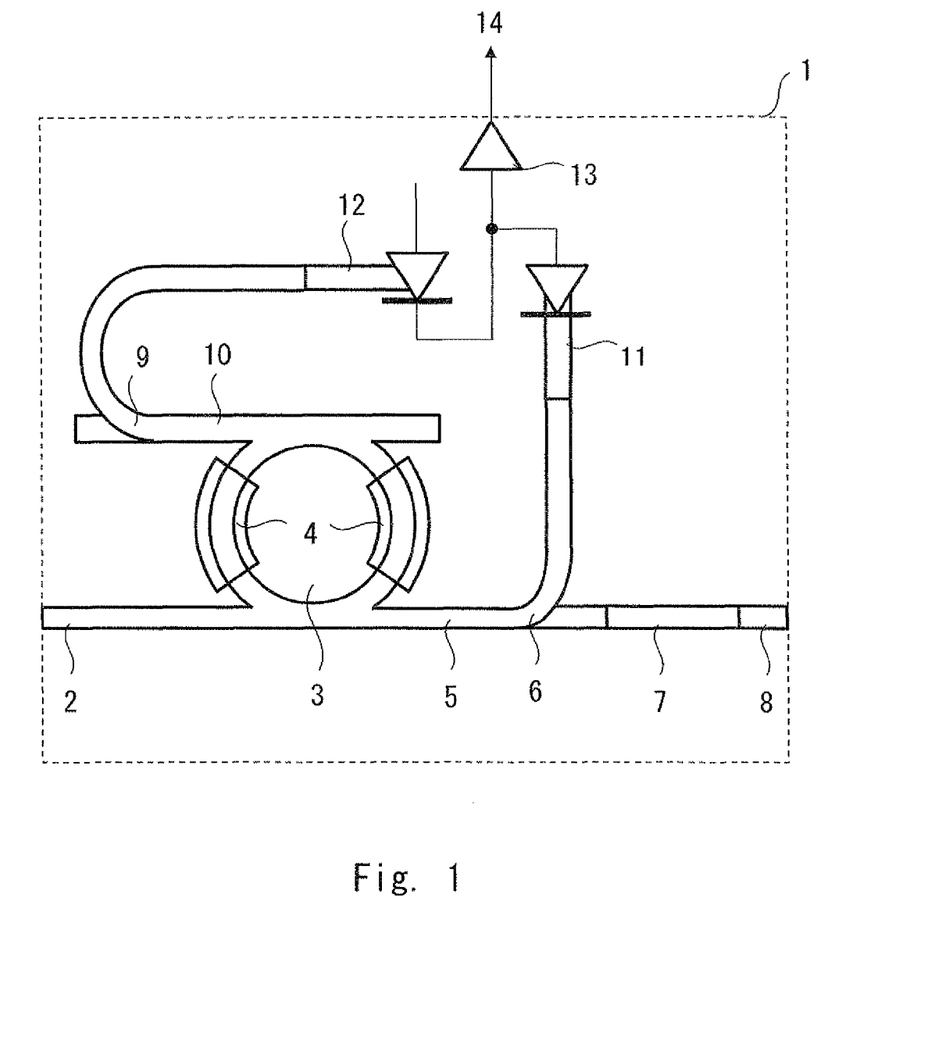
FIG. 1 is a configuration diagram of an optical intensity determination unit according to a first exemplary embodiment.

Proposed in this exemplary embodiment is a configuration of an optical intensity determination unit for converting optical intensity information into phase information to determine input intensity. FIG. 1 is a configuration diagram of an optical intensity determination unit according to the first exemplary embodiment. An optical intensity phase converter converts information of optical intensity into information of phase difference. As shown in FIG. 1, an optical intensity determination unit 1 includes an optical input port 2, a ring resonator 3, an optical intensity phase conversion unit 4, a through port 5, optical branching circuits 6 and 9, an optical level adjustment unit 7, an optical output port 8, a drop port 10, light receivers (PD) 11 and 12, an electric signal amplifier 13, and an electric signal output port 14.

In FIG. 1, light input from the optical input port 2 passes through the ring resonator 3. The ring resonator 3 has periodic wavelength dependence in the transmission characteristics. The finesse of the ring resonator 3 is set to about 2, and is initially set so that the wavelength passing most frequently will transmit. Further, the ring resonator 3 includes an optical intensity phase conversion unit 4 (a part for converting the optical intensity into optical phase information by the SPM effect) in a part of a ring waveguide. Specifically, in the configuration shown in FIG. 1, two optical intensity phase conversion units 4 are provided to be opposed to each other in the ring waveguide of the ring resonator 3. However, the setting and the arrangement are not limited to this. In this optical intensity phase conversion unit 4, the optical phase is rotated substantially in proportion to the optical intensity. As a result, the transmission characteristics of the ring resonator 3, i.e., the optical outputs from the through port 5 and the drop port 10 have periodic dependence with respect to the magnitude of the optical input intensity from the optical input port 2.

As the optical intensity phase conversion unit 4, a semiconductor optical amplifier (SOA) may be used, for example. With the use of the semiconductor optical amplifier, it is normally possible to change the optical intensity in a short distance. Since the change of the inside carrier density changes the refractive index, the phase of the light is also rotated at the same time. This is the SPM effect. It is desired in the optical intensity phase conversion unit 4 to rotate only the optical phase without changing the optical intensity as much as possible. This can be achieved by flowing high current through the SOA, which may be used in a saturated state.

In order to achieve the effect stated above, the optical intensity phase conversion unit 4 has a core layer having a composition different from that of waveguides in other parts of the ring resonator 3. Specifically, while an InGaAsP multiple quantum well is used as the core layer of the optical intensity phase conversion unit 4, its composition bandgap wavelength is set to be almost the same or somewhat longer compared to the wavelength of the light that is used. Since the wavelength range used in typical optical communication is around 1.55 μm, the composition bandgap wavelength is also set to about 1.55-1.6 μm. On the other hand, in waveguides transparent for light other than the optical intensity phase conversion unit 4, the composition bandgap wavelength of the core layer is 1.3-1.5 μm.

Figure 2:
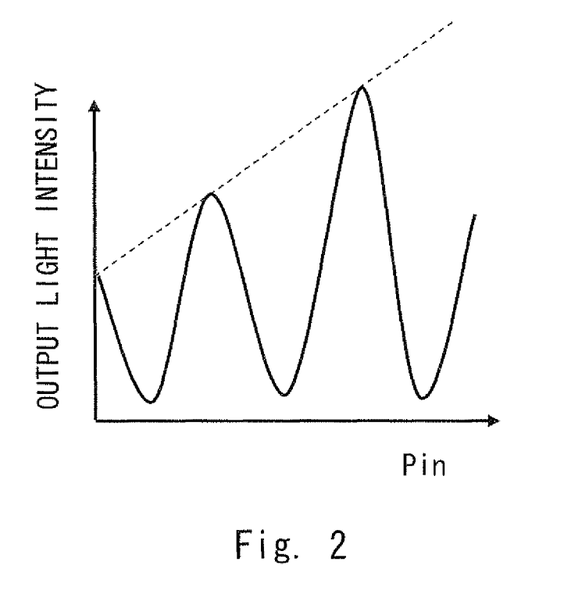
FIG. 2 is a diagram showing output light intensity to a through port of the optical intensity determination unit with respect to optical input intensity (Pin) according to the first exemplary embodiment.
Figure 3:
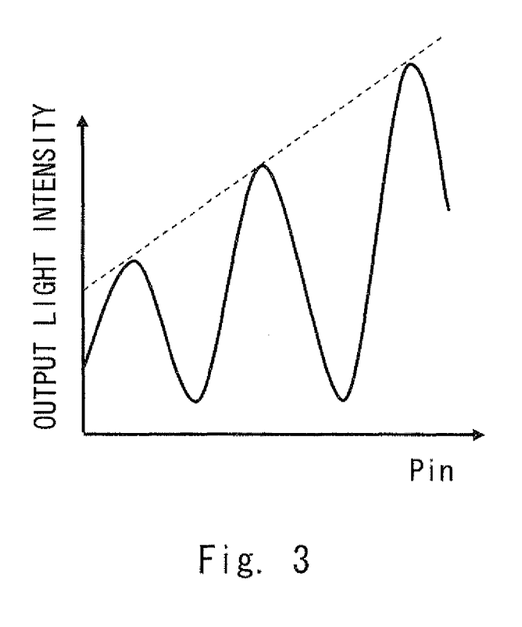
FIG. 3 is a diagram showing output light intensity to a drop port of the optical intensity determination unit with respect to the optical input intensity (Pin) according to the first exemplary embodiment.

FIGS. 2 and 3 show changes in optical output intensity (vertical axis) from the through port 5 and the drop port 10 of the ring resonator 3 with respect to optical intensity Pin (horizontal axis) in the optical input port 2, respectively. Since the finesse of the ring resonator 3 is set to about 2, the optical output characteristics are basically indicated by substantially sine curves. Further, the optical output intensity from the through port 5 and the optical output intensity from the drop port 10 have a reciprocal relation to each other. However, the difference from a typical ring resonator is that, as a result of the optical intensity phase conversion by the optical intensity phase conversion unit 4 provided inside the ring resonator 3, the optical output intensity is indicated by a sine curve in which the amplitude increases in contact with components in proportion to the optical input intensity (dotted lines in FIGS. 2 and 3).

The light from the through port 5 and the light from the drop port 10 are tapped with a branch ratio of 1:9, for example, by the first optical branching circuit 6 and the second optical branching circuit 9, respectively, and are respectively received by the first light receiver 11 and the second light receiver 12. As shown in FIG. 1, the first and second light receivers 11 and 12 are electrically connected in a so-called balanced receiver configuration. Then, a signal determining which of the output of the first light receiver 11 and that of the second light receiver 12 is higher is output. This signal is output to the electric signal output port 14 through the electric amplifier 13.

Figure 4:
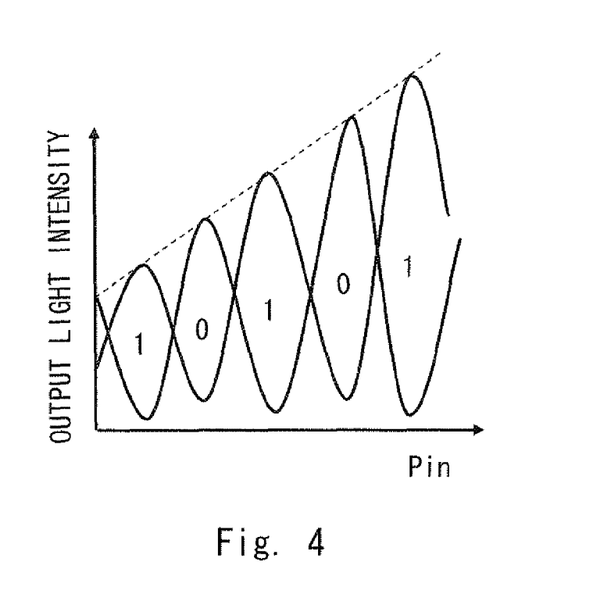
FIG. 4 is a diagram showing an example in which signals detected by two photodetectors are overlapped, and the magnitudes are determined as 1 or 0 according to the first exemplary embodiment.
Figure 5:
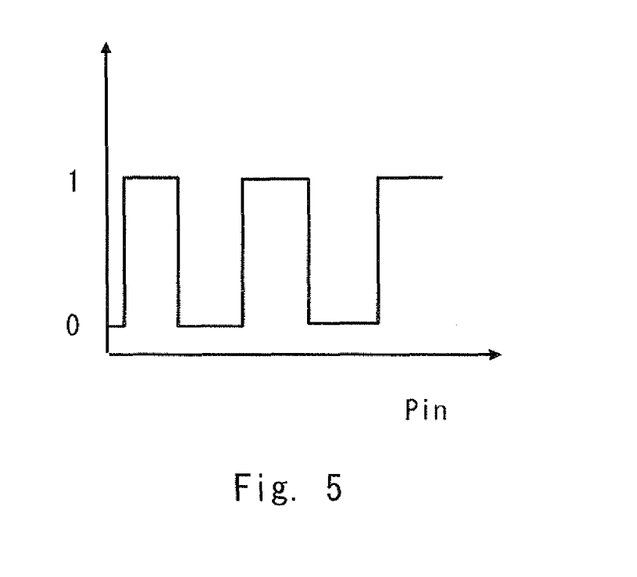
FIG. 5 is a diagram showing an example in which results of the determination of 1 or 0 of the optical input intensity (Pin) are output as digital electric signals.

FIG. 4 is a diagram in which the signals of FIGS. 2 and 3 are overlapped. Since the first light receiver 11 and the second light receiver 12 are connected in the balanced receiver configuration, magnitudes of the output signals from the first and second light receivers as shown in FIGS. 2 and 3 are compared and only digital signals determined as 1 or 0 as shown in FIG. 4 are output to the electric signal output port 14. FIG. 5 shows the output results. When the signals as shown in FIGS. 2 and 3 are made closer to sine curves, the intervals of the intersections for determining the magnitudes can be made substantially equal. In this way, it is possible to determine the magnitudes with periodic dependence with respect to the optical input intensity Pin from the optical input port 2.

Further, light that was not diverted to the first light receiver 11 in the first optical branching circuit 6 propagates through the optical intensity adjustment unit 7, where the optical level of the light is adjusted, and then output to the optical output port 8. At this time, the optical gain of the optical intensity adjustment unit 7 is adjusted by the optical intensity adjustment unit 7 so that the light is output with the same optical intensity as the optical intensity Pin input from the optical input port 2.

As the optical intensity adjustment unit 7, a semiconductor optical amplifier (SOA) may be used, for example. Further, a multi mode interference (MMI) branching circuit or a directional coupler (DC) may be used as the first and second optical branching circuits. Both of the MMI and the DC are able to adjust the branch ratio by the design, and the branch ratio is not limited to 1:9 stated above.

Further, while the ring resonator is used as an example, any other component may be used as long as it has a structure of indicating the periodic intensity output with respect to the optical input frequency. The essential point of the present application lies in that a ring resonator or the like which normally indicates the periodic intensity output with respect to the frequency is combined with an optical intensity phase conversion unit that rotates the phase with respect to the intensity, which provides the periodicity of the intensity with respect to the intensity as a whole. An asymmetric Mach-Zehnder interferometer or a Fabry-Perot resonator may be used, for example, in place of the ring resonator. Such a component that indicates the periodic intensity output with respect to the frequency may be used.

While shown in this exemplary embodiment is a diagram in which the components including the waveguides and the ring resonator are integrated, it is not limited to this. The components may be structured and connected by optical fibers.

(Second Exemplary Embodiment)

Figure 6:
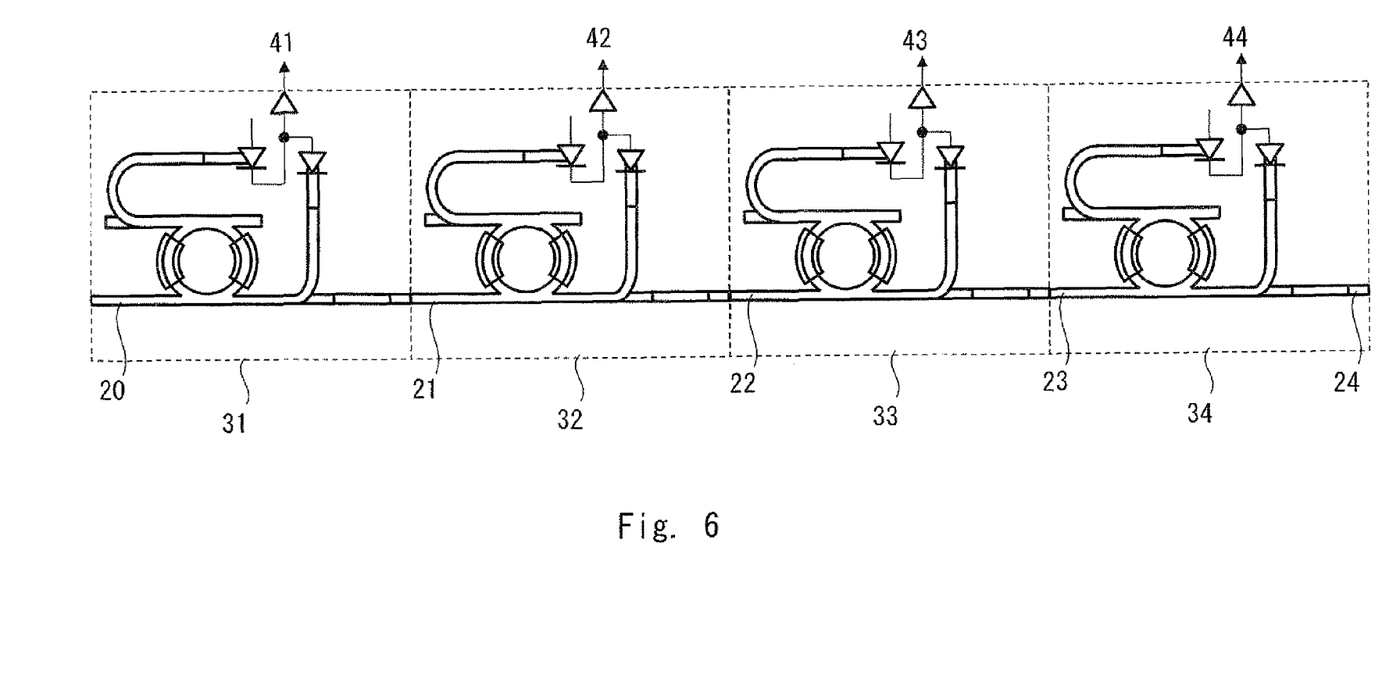
FIG. 6 is a configuration diagram of an optical A/D converter according to a second exemplary embodiment.

Next, an optical A/D converter according to a second exemplary embodiment of the present invention will be described. FIG. 6 shows an optical A/D converter that internally includes the optical intensity determination unit according to the first exemplary embodiment.

Incidentally, in order to demodulate multi-valued and multiplexed optical signals, it is required to detect the state of the phase and the amplitude of the light. However, it is difficult to detect the state of the light on a complex plane. Thus, according to a typical method, the signal is divided into a real part I and an imaginary part Q at a previous stage, and the intensity information of the real part I and that of the imaginary part Q are detected by a receiver (PD).

For example, according to a method called coherent optical detection, an apparatus called an optical phase hybrid is used to allow each of four local light having phases shifted by 90 degrees to interfere with signal light to obtain dual output light for each of the real part I and the imaginary part Q, and each light is received by a PD (Photodiode). According to the present invention, optical A/D conversion is performed by using the intensity information in each route after the optical signal has already been divided into the real part I or the imaginary part Q.

In related techniques, in order to detect the intensity of light, the light is received by the PD and then converted into an electric signal, which is then converted into a digital value by an A/D converter by an electric circuit. When the optical A/D converter is used, it is difficult to subtract light having a predetermined level of intensity from light having a certain level of intensity because the light is directly used. Therefore, the configuration of the optical A/D converter is considered to be complex. According to the present invention, a circuit for converting the intensity into a phase difference is further added, and processing is performed using the optical phase. Accordingly, in the exemplary embodiment of the present invention described below, light itself can be used, and the optical intensity is dissolved into multiple bits, which are retrieved as digital values.

Figure 7A:
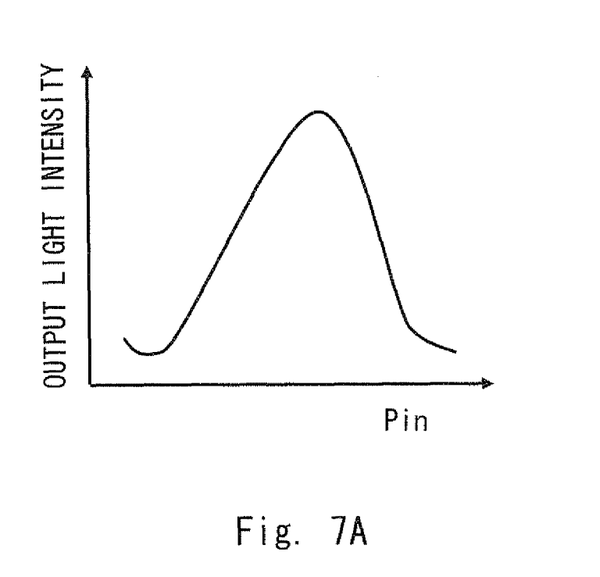
FIG. 7A is a diagram showing optical input intensity (Pin) dependence of optical output intensity from an optical output port of an optical output determination unit 31 according to the second exemplary embodiment.

FIG. 6 shows a configuration example of four bits. As shown in FIG. 6, four optical intensity determination units, each of which being the one shown in FIG. 1, are connected in series. The optical intensity from an optical input port 20 is denoted by Pin. As shown in FIG. 7A, the first optical intensity determination unit 31 to which the light first inputs has an optical intensity phase conversion characteristic that only uses a periodic characteristic that the output light intensity increases and decreases only once with respect to the optical input intensity Pin. This can be achieved by adjusting the phase change amount of the optical intensity phase conversion unit 4 in FIG. 1. Specifically, it can be achieved by adjusting the length of the optical intensity phase conversion unit 4 with respect to the round-trip length of the ring resonator 3.

As described above, in the optical intensity phase conversion unit in which the output light intensity is increased or decreased only once with respect to the optical input intensity Pin, the length is set in the ring resonator so that the phase rotation becomes $2\pi$ according to the optical intensity from the minimum optical intensity to the maximum optical intensity. Specifically, assuming a case in which the SOA is used and the SPM is used in a state in which the SOA is in the saturated state, the maximum carrier density in the SOA is considered to be about $10^{19}$ cm$^{-3}$ and the minimum carrier density in the SOA is considered to be about $10^{18}$ cm$^{-3}$. It is considered that the carrier density is changed in the SOA from the maximum to the minimum in the longitudinal direction with linear approximation by the SPM. However, calculating from the resulting standard refractive index variation, the length of about 200 μm is needed for the change in refractive index of $2\pi$. Assume that the optical branching circuit requires the size of about 50 μm, the total length of the ring becomes 250 μm. Thus, the diameter of the ring is set to about 80μ. In this way, it is possible to use the first optical intensity determination unit 31 to determine the most significant bit (the maximum side of the intensity) of four-bit output.

Figure 7B:
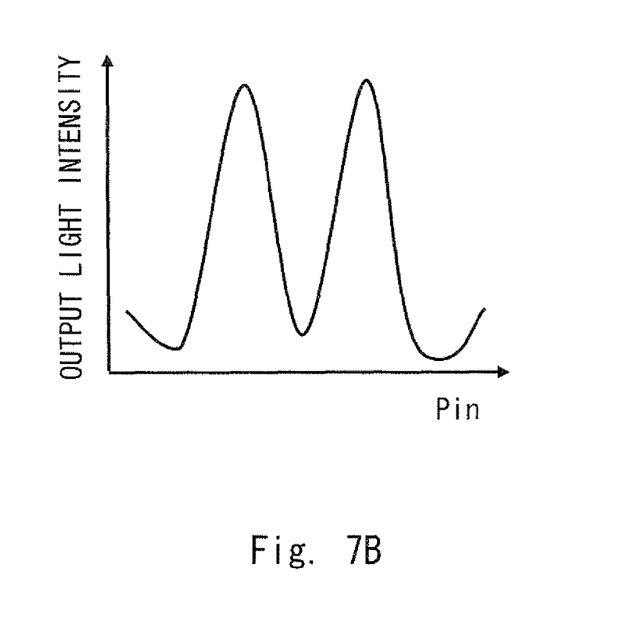
FIG. 7B is a diagram showing optical input intensity (Pin) dependence of optical output intensity from an optical output port of an optical output determination unit 32 according to the second exemplary embodiment.
Figure 7C:
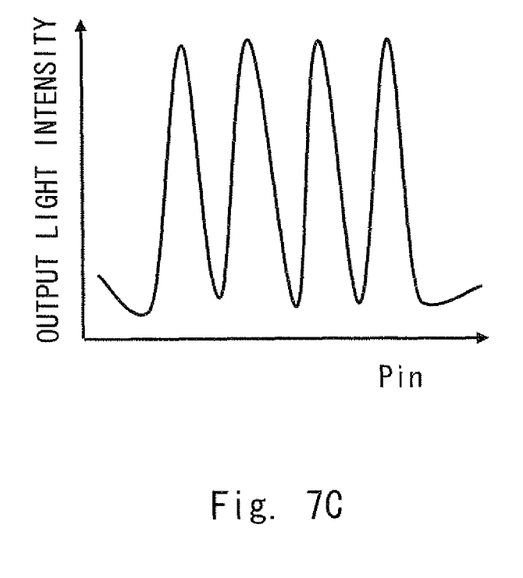
FIG. 7C is a diagram showing optical input intensity (Pin) dependence of optical output intensity from an optical output port of an optical output determination unit 33 according to the second exemplary embodiment.
Figure 7D:
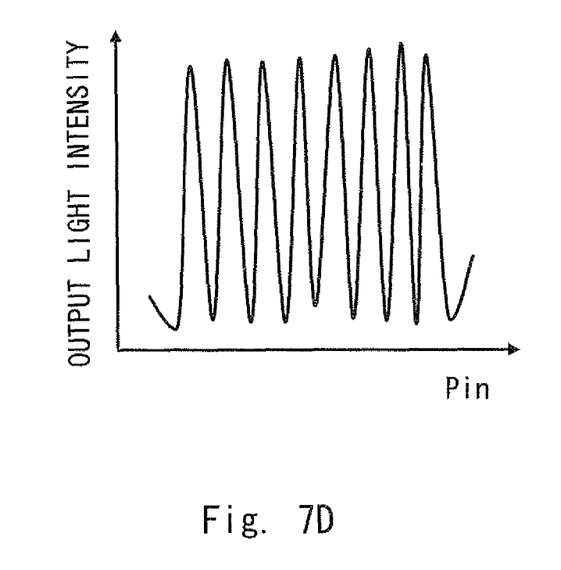
FIG. 7D is a diagram showing optical input intensity (Pin) dependence of optical output intensity from an optical output port of an optical output determination unit 34 according to the second exemplary embodiment.

Further, the optical output intensity from the first optical intensity determination unit 31 already have a periodic characteristic of one cycle (0→1→0 as shown in FIG. 7A). Thus, when the light is input to an optical input port 21 of a second optical intensity determination unit 32 which is arranged next to the first optical intensity determination unit 31, the output characteristic indicates an iterative periodic characteristic of two cycles (0→1→0→1→0) as shown in FIG. 7B. In summary, the repetition cycle is halved. This is because, when the optical intensity that changes as 0→1→0 is input to the optical input port 21, the output from the through port of the second optical intensity determination unit 32 first becomes 0→1→0 for the input of 0→1. Then, the output again becomes 0→1→0 for the input of 1→0. In summary, this gives a repetition cycle which is further halved (0→1→0→1→0) as a whole. Similarly, the light is input to an optical input port 22 of a third optical intensity determination unit 33, and is output with a repetition cycle which is further halved (FIG. 7C). Further, the light is input to an optical input port 23 of a fourth optical intensity determination unit 34, and is output with a repetition cycle which is further halved (FIG. 7D).

Figure 8:
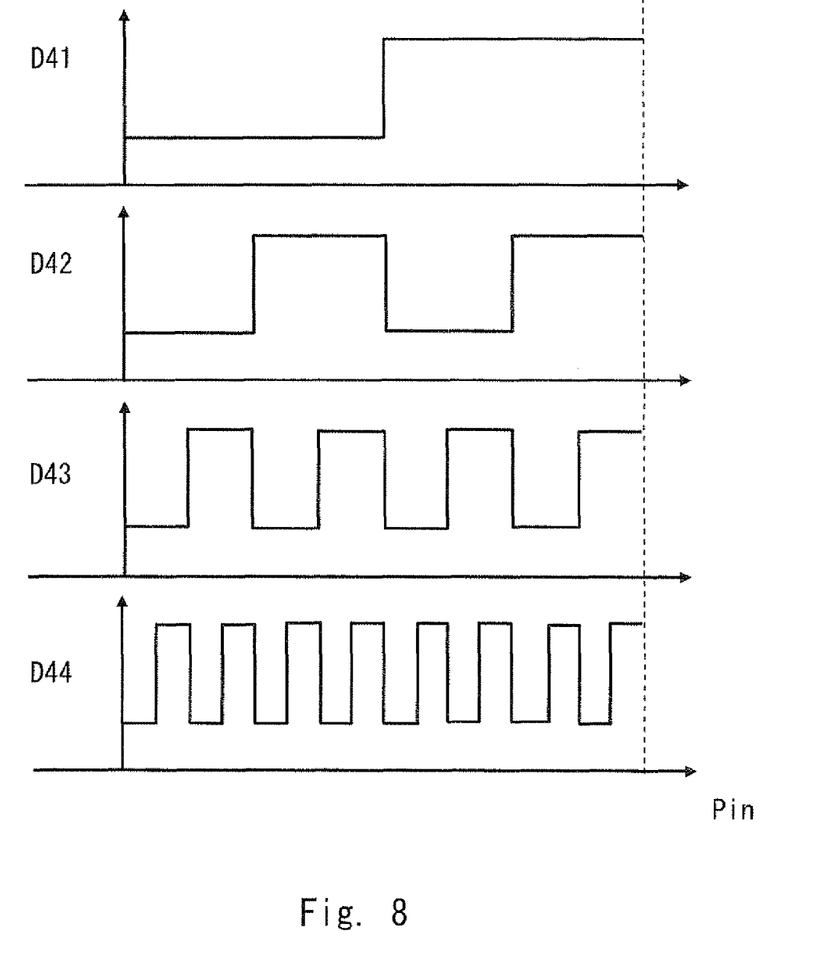
FIG. 8 is a diagram showing optical input intensity (Pin) dependence of digital electric signals output from a plurality of optical output determination units according to the second exemplary embodiment.

As described above, by connecting the optical intensity determination units in series to a lower bit, even when the optical intensity determination units have the same configuration, such a periodic characteristic is achieved in which the repetition number is doubled every time the light transmits through the optical intensity determination unit, whereby bit output of binary digits can be achieved. As the optical A/D converter, the output of each bit from the optical intensity determination units 31-34 is output from electric signal output ports 41-44 as digital signals D41-D44. FIG. 8 shows this state. It will be shown that lower bits have shorter repetition cycles.

While the example of four bits has been shown in FIG. 6, n-bit optical A/D converters may be formed by connecting n pieces of optical intensity determination units in series. Further, one effect is that it is easy to increase the bit number since the length of the device only becomes n times larger with respect to the bit number n as described above. In one optical intensity determination unit, as described in the first exemplary embodiment, by matching the input intensity and the output intensity of the light by the optical level adjustment unit, the first to fourth optical intensity determination units may have completely the same configuration. While shown in FIG. 6 is an example in which components such as the waveguides and the ring resonator are integrated, it is not limited to this. The components may be structured and connected by optical fibers.

(Third Exemplary Embodiment)

Figure 9:
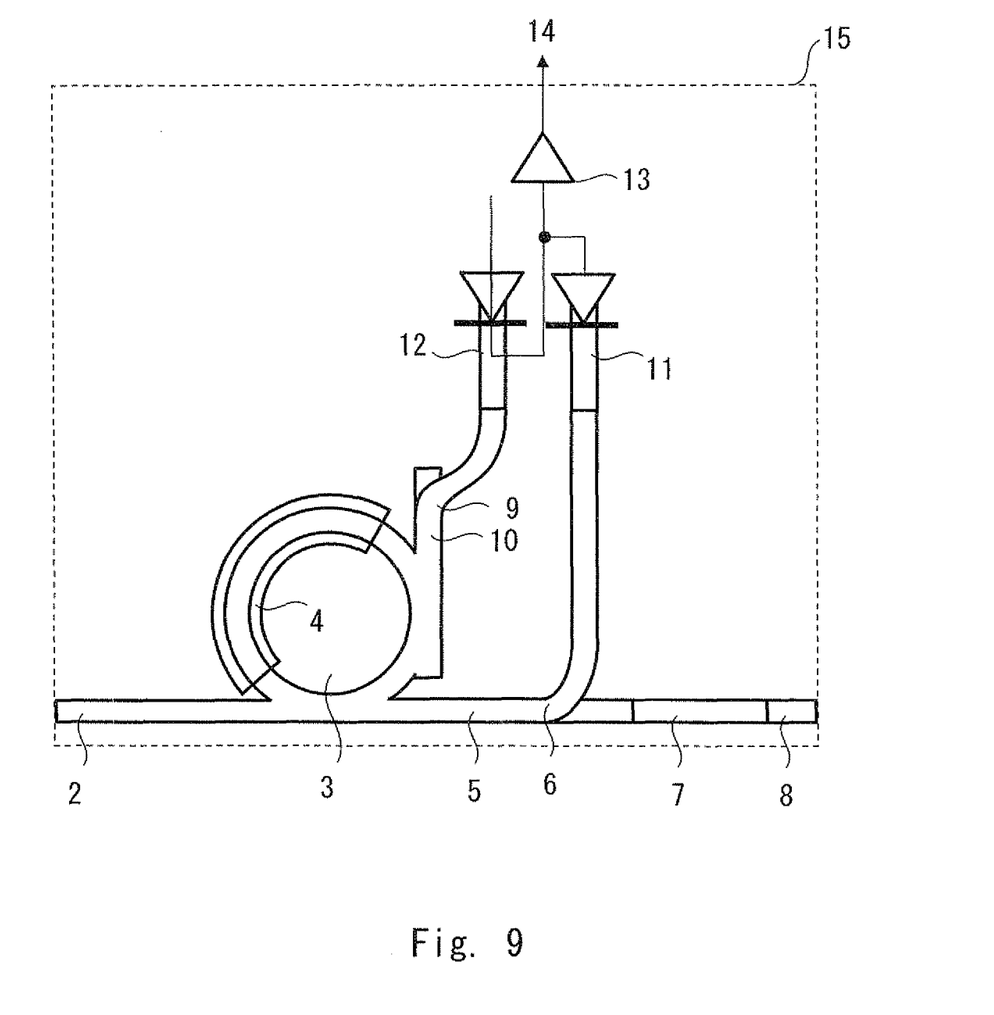
FIG. 9 is a configuration diagram of an optical intensity determination unit according to a third exemplary embodiment.

Next, FIG. 9 shows an example of an optical intensity determination unit 15 including a ring resonator whose configuration is different from that of the ring resonator in the first exemplary embodiment as the optical intensity determination unit. The location of the drop port 10 is changed compared to the ring resonator 3 described in the first exemplary embodiment. Accordingly, the first light receiver 11 and the second light receiver 12 can be arranged almost in parallel with each other, which exhibits a standard configuration of a balanced receiver. In accordance to this, the optical intensity phase conversion units 4 divided into two parts and arranged opposed to each other are integrally formed. The first light receiver 11 and the second light receiver 12 as a balanced receiver may also be arranged outside the optical intensity determination unit 15.

(Fourth Exemplary Embodiment)

Figure 10:
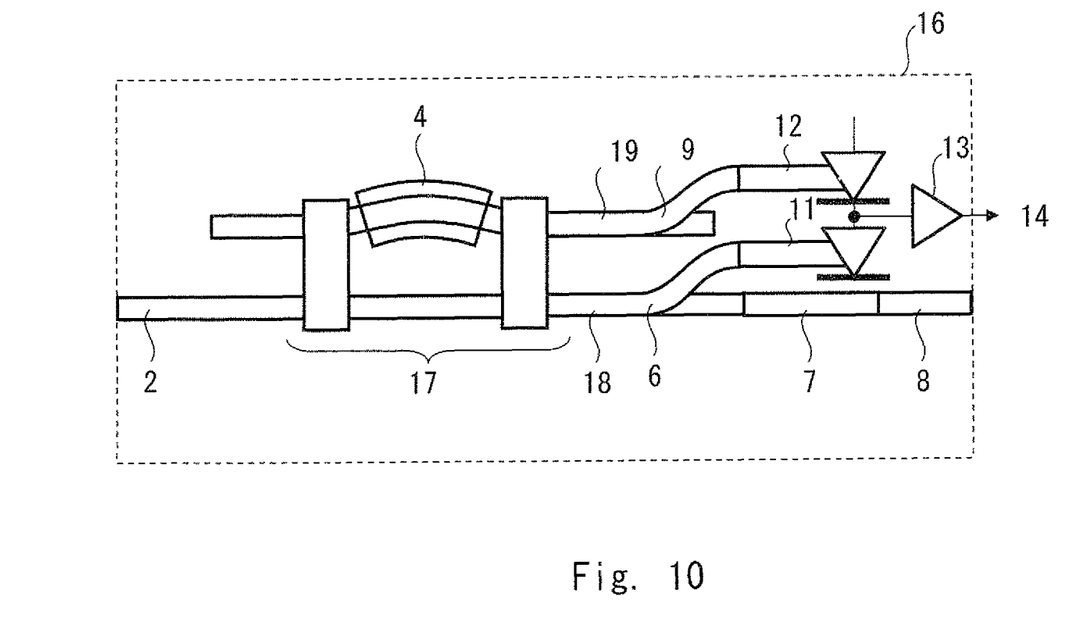
FIG. 10 is a configuration diagram of an optical intensity determination unit according to a fourth exemplary embodiment.

Next, FIG. 10 shows an example of an optical intensity determination unit 16 formed by using an asymmetric Mach-Zehnder interferometer 17 as an optical intensity determination unit. The through port 5 and the drop port 10 of the ring resonator 3 shown in the first exemplary embodiment correspond to a first MZ output port 18 and a second MZ output port 19, respectively. Other configurations are the same to those shown in FIG. 1.

While described above in the exemplary embodiments is the example of applying the optical intensity determination unit including the optical intensity phase conversion unit to the optical A/D converter, it is not limited to this. The intensity of the signal light is reflected in the phase information of continuous light by the optical intensity phase conversion unit, and when it is further applied to a resonator structure such as a ring, it is converted into an intensity signal. Accordingly, typically, when the wavelength of the signal light is different from the wavelength of the continuous light, it can also be used as a wavelength converter. Such an application is also possible.

Further, the optical A/D converter using the optical intensity phase converter according to the exemplary embodiments stated above may be used in an optical demodulator circuit, by taking advantages of high speed and low power. Specifically, such an optical A/D converter can be included in a coherent detection circuit or an optical direct detection circuit.

While the present invention has been described with reference to the exemplary embodiments, the present invention is not limited to the description above. Various changes that can be understood by a person skilled in the art may be made to the configuration and the detail of the present invention within the scope of the present invention.

This application claims the benefit of priority, and incorporates herein by reference in its entirety, the following Japanese Patent Application No. 2010-178465 filed on Aug. 9, 2010.

INDUSTRIAL APPLICABILITY

The present invention is applicable to an optical intensity determination unit for converting intensity of input light into phase information to determine input light intensity, and an optical A/D converter using the optical intensity determination unit.

REFERENCE SIGNS LIST

1 OPTICAL INTENSITY DETERMINATION UNIT
2 OPTICAL INPUT PORT
3 RING RESONATOR
4 OPTICAL INTENSITY PHASE CONVERSION UNIT
5 THROUGH PORT
6, 9 OPTICAL BRANCHING CIRCUIT
7 OPTICAL LEVEL ADJUSTMENT UNIT
8 OPTICAL OUTPUT PORT
10 DROP PORT
11, 12 LIGHT RECEIVER (PD)
13 ELECTRIC SIGNAL AMPLIFIER
14 ELECTRIC SIGNAL OUTPUT PORT
16 OPTICAL INTENSITY DETERMINATION UNIT
17 ASYMMETRIC MACH-ZEHNDER INTERFEROMETER
18, 19 MZ OUTPUT PORT
20, 21, 22, 23 OPTICAL INPUT PORT
24 OPTICAL OUTPUT PORT
31, 32, 33, 34 OPTICAL INTENSITY DETERMINATION UNIT
41, 42, 43, 44 ELECTRIC SIGNAL OUTPUT PORT

The invention claimed is:

1. An optical intensity determination unit comprising:
an optical input port;
an optical output port;
an optical resonator provided between the optical input port and the optical output port;
a first light receiving element for converting at least a part of an optical signal output from a first output port of the optical resonator into an electric signal;
a second light receiving element for converting at least a part of an optical signal output from a second output port of the optical resonator into an electric signal;
a comparing circuit for determining magnitudes of the electric signals output from the first light receiving element and the second light receiving element to output a digital signal; and
an optical branching circuit for branching light output from the second output port of the optical resonator into the optical output port and the second light receiving element,
wherein an optical intensity phase conversion unit for modulating an optical phase according to intensity of input light is provided in a part of a waveguide in the optical resonator.

2. The optical intensity determination unit according to claim 1, further comprising an optical level adjustment unit provided between the optical branching circuit and the optical output port and adjusting output light intensity.

3. The optical intensity determination unit according to claim 1, wherein the optical intensity phase conversion unit comprises a semiconductor optical amplifier.

4. The optical intensity determination unit according to claim 1, wherein the optical intensity phase conversion unit is a ring resonator.

5. The optical intensity determination unit according to claim 1, wherein the optical resonator is a Fabry-Perot resonator.

6. An optical A/D converter comprising a plurality of optical intensity determination units according to claim 1, wherein the plurality of optical intensity determination units are connected in series.

7. The optical A/D converter according to claim 6, wherein the plurality of optical intensity determination units have a same structure.

8. A method of manufacturing an optical intensity determination unit comprising:
providing an optical resonator between an optical input port and an optical output port;

providing a first light receiving element for converting at least a part of an optical signal output from a first output port of the optical resonator into an electric signal;
providing a second light receiving element for converting at least a part of an optical signal output from a second output port of the optical resonator into an electric signal;
providing a comparing circuit for determining magnitudes of the electric signals output from the first light receiving element and the second light receiving element to output a digital signal; and
providing an optical branching circuit for branching light output from the second output port of the optical resonator into the optical output port and the second light receiving element,
wherein an optical intensity phase conversion unit for modulating an optical phase according to intensity of input light is provided in a part of a waveguide in the optical resonator.

* * * * *